United States Patent
Mielenz et al.

(10) Patent No.: US 11,259,159 B2
(45) Date of Patent: Feb. 22, 2022

(54) METHOD AND DEVICE FOR CONTROLLING VEHICLE SENSOR SYSTEMS

(71) Applicant: Robert Bosch GmbH, Stuttgart (DE)

(72) Inventors: Holger Mielenz, Ostfildern (DE); Jan Rohde, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 470 days.

(21) Appl. No.: 16/330,566

(22) PCT Filed: Aug. 3, 2017

(86) PCT No.: PCT/EP2017/069731
§ 371 (c)(1),
(2) Date: Mar. 5, 2019

(87) PCT Pub. No.: WO2018/046203
PCT Pub. Date: Mar. 15, 2018

(65) Prior Publication Data
US 2021/0289329 A1 Sep. 16, 2021

(30) Foreign Application Priority Data
Sep. 8, 2016 (DE) .......................... 102016217081.3

(51) Int. Cl.
*H04W 4/00* (2018.01)
*H04W 4/46* (2018.01)
(Continued)

(52) U.S. Cl.
CPC .......... *H04W 4/46* (2018.02); *G06K 9/00791* (2013.01); *H04W 64/003* (2013.01); *H04W 76/15* (2018.02); *H04W 84/18* (2013.01)

(58) Field of Classification Search
CPC .......... H04W 4/38; H04W 4/40; H04W 4/44; H04W 4/46; G06K 9/00791
See application file for complete search history.

(56) References Cited

U.S. PATENT DOCUMENTS

2010/0289660 A1 11/2010 Bonne
2012/0221172 A1 8/2012 Anderson
(Continued)

FOREIGN PATENT DOCUMENTS

CN 102590793 A 7/2012
DE 102011083039 A1 3/2013
(Continued)

OTHER PUBLICATIONS

International Search Report dated Oct. 17, 2017 of the corresponding International Application PCT/EP2017/069731 filed on Aug. 3, 2017.

*Primary Examiner* — Omoniyi Obayanju
(74) *Attorney, Agent, or Firm* — Norton Rose Fulbright US LLP; Gerard Messina

(57) ABSTRACT

A method for receiving, processing, and transmitting data includes receiving first data values that include first surroundings data values representing surroundings of, and detected using a first surroundings sensor system of, a first vehicle and first pieces of information about the first surroundings sensor system; receiving second data values that include second surroundings data values representing surroundings of, and detected using a second surroundings sensor system of, a second vehicle and second pieces of information about the second surroundings sensor system; evaluating the quality of the first and the second surroundings sensor systems based on the first and second data values; and transmitting a signal for influencing the first and/or second surroundings sensor systems based on the evaluation.

10 Claims, 4 Drawing Sheets

(51) Int. Cl.
*H04W 76/15* (2018.01)
*G06K 9/00* (2022.01)
*H04W 64/00* (2009.01)
*H04W 84/18* (2009.01)

(56) References Cited

U.S. PATENT DOCUMENTS

2014/0358412 A1* 12/2014 Fausten .................. G08G 1/16
 701/117
2015/0145995 A1* 5/2015 Shahraray ............... H04L 67/12
 348/148
2016/0061935 A1* 3/2016 McCloskey ........... G01S 7/4008
 342/82

FOREIGN PATENT DOCUMENTS

| | | |
|---|---|---|
| DE | 202015001428 U1 | 7/2015 |
| DE | 102014014295 A1 | 3/2016 |
| JP | 2011003206 A | 1/2011 |

* cited by examiner

METHOD AND DEVICE FOR CONTROLLING VEHICLE SENSOR SYSTEMS

CROSS-REFERENCE TO RELATED APPLICATIONS

The present application is the national stage of International Pat. App. No. PCT/EP2017/069731 filed Aug. 3, 2017, and claims priority under 35 U.S.C. § 119 to DE 10 2016 217 081.3, filed in the Federal Republic of Germany on Sep. 8, 2016, the content of each of which are incorporated herein by reference in their entireties.

FIELD OF THE INVENTION

The present invention relates to a method and to a device for receiving, processing, and transmitting data, where first and second data values are received, the quality of a surroundings sensor system is evaluated, and a signal for influencing the surroundings sensor system is transmitted as a function of the quality evaluation.

SUMMARY

According to an example embodiment, a method for receiving, processing, and transmitting data includes receiving first data values that include first surroundings data values and first pieces of information about a first surroundings sensor system of a first vehicle, the first surroundings data values representing surroundings of the first vehicle and being detected using the first surroundings sensor system. The method further includes receiving second data values that include second surroundings data values and second pieces of information about a second surroundings sensor system of a second vehicle, the second surroundings data values representing surroundings of the second vehicle and being detected with the aid of the second surroundings sensor system. The method further includes evaluating the quality of the first surroundings sensor system and of the second surroundings sensor system as a function of the first data values and of the second data values, and transmitting a signal for influencing the first and/or the second surroundings sensor system(s) as a function of the evaluation of the quality of the first surroundings sensor system and of the second surroundings sensor system.

An advantage of the method described herein is that the surroundings of a vehicle are detected without the detection being interfered with by the surroundings sensor system of other vehicle systems. This method also contributes to the robustness and functionality of such vehicle systems. This results in an advantageous influence of the traffic safety, both for the vehicle, the surroundings sensor system of which is changed in accordance with the method presented herein, as well as for all other vehicles that use the method.

A potential interference of a surroundings sensor system by another surroundings sensor system can take place, for example, in that radar sensors are used in each case for detecting the surroundings and the radar waves mutually overlap in such a way that a destructive interference of the radio waves results and thus both the one surroundings sensor system as well as the other surroundings sensor system receive a poorer signal.

The reception of the first and/or of the second data values and/or the transmission of the signal for influencing preferably takes place with the aid of a radio link, for example, using at least one first mobile transceiver, in particular, a smartphone.

The use of a radio link allows for a long range connection, which is also possible—for example, with the aid of a smartphone—with no additional communication unit in a vehicle.

The first data values preferably include first trajectory data values that represent a first trajectory of the first vehicle, and/or the second data values include second trajectory data values that represent a second trajectory of the second vehicle. This has an advantage that it can be precisely determined in which area the method is to be carried out, since areas, in which a reliable detection of the surroundings for all vehicles involved is of major relevance for their safety, can be determined based on the first and/or the second trajectory data values.

The quality of the first surroundings sensor system and of the second surroundings sensor system is preferably evaluated by evaluating additional surroundings data values, based on the first surroundings data values and the second surroundings data values, and by comparing the additional surroundings data values with predefined parameters according to predefined criteria.

The determination of the quality of the first surroundings sensor system and of the second surroundings sensor system is particularly advantageous, since this assessment of the surroundings sensor system and the subsequent method carried out as a function thereof allows a best possible detection of the surroundings of all vehicles involved to be enabled.

In a particularly preferred example embodiment, the signal for influencing the first surroundings sensor system and/or the second surroundings sensor system is transmitted in such a way that the first surroundings sensor system and/or the second surroundings sensor system is/are at least partially switched off. This yields an advantage that the interfering influence, for example, of an individual surroundings sensor system is reduced and/or completely suppressed, which allows overall a best possible detection of the surroundings.

The signal for influencing the first surroundings sensor system and/or the second surroundings sensor system is preferably transmitted in such a way that the first and/or the second surroundings sensor system is/are at least partially switched off in such a way that that third data values detected using the first surroundings sensor system and/or of the second surroundings sensor system are received. This advantageously allows the third data values to encompass a better and/or more complete and/or long range and/or quicker surroundings detection.

The third data values detected with the aid of the first surroundings sensor system and/or of the second surroundings sensor system preferably include third surroundings data values, the third surroundings data values representing surroundings of the first vehicle and of the second vehicle.

In a particularly preferred example embodiment, the third surroundings data values are transmitted to the first vehicle and/or to the second vehicle and/or to at least one additional vehicle.

This yields an advantage that the surroundings data values, which represent the surroundings of all vehicles involved in a particularly advantageous manner, are provided specifically to the vehicles involved, thus increasing the safety of these vehicles.

According to an example embodiment of the present invention, a device for receiving, processing, and transmitting data includes first receiving means for receiving first data values that include first surroundings data values and first pieces of information about a first surroundings sensor system of a first vehicle, the first surroundings data values representing surroundings of the first vehicle and being detected using the first surroundings sensor system. The device further includes second receiving means for receiving second data values that include second surroundings data values and second pieces of information about a second surroundings sensor system of a second vehicle, the second surroundings data values representing surroundings of the second vehicle and being detected with the aid of the second surroundings sensor system. Moreover, the device includes evaluation means for evaluating the quality of the first surroundings sensor system and of the second surroundings sensor system as a function of the first data values and of the second data values, and transmission means for transmitting a signal for influencing the first surroundings sensor system and or the second surroundings sensor system as a function of the evaluation of the quality of the first surroundings sensor system and of the second surroundings sensor system.

In a particularly preferred example embodiment, the first receiving means and/or the second receiving means and/or the evaluation means and/or the transmission means is/are designed to carry out the described method above.

According to an example embodiment of the present invention, a device in a vehicle includes third receiving means for receiving a signal for influencing a surroundings sensor system, which is generated according to the method described above, and control means for controlling a surroundings sensor system as a function of the received signal for influencing the surroundings sensor system.

According to an example embodiment, a computer program is designed to be executed to carry out an evaluation of the quality according to the described method.

Example embodiments of the present invention are depicted in the drawings and are explained in greater detail in the following descriptions, and advantageous refinements of the present invention can be understood from the following description and the claims.

DETAILED DESCRIPTION

Figure 1:
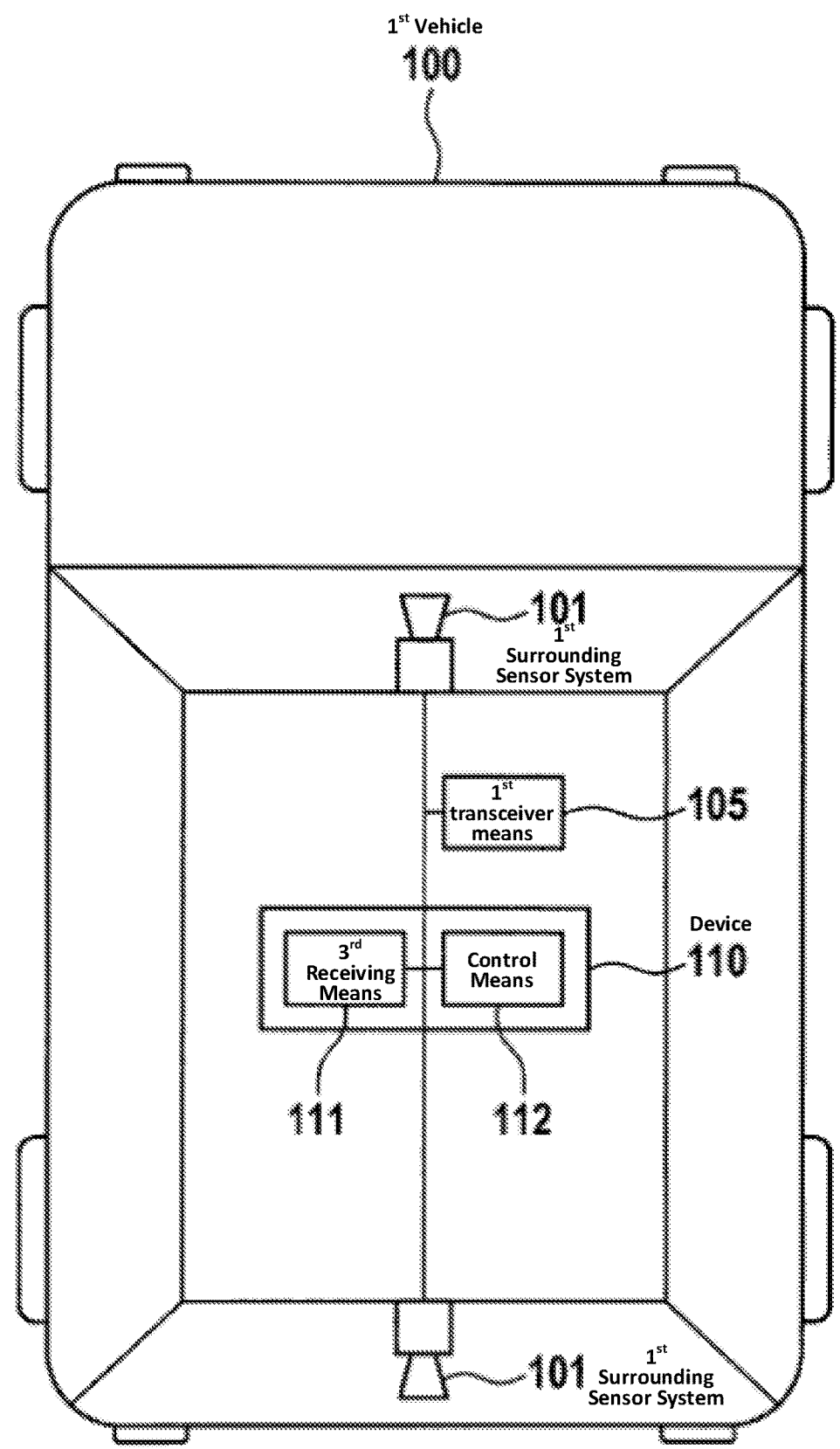
FIG. 1 shows a vehicle adapted for performing a method according to an example embodiment of the present invention.

FIG. 1 shows first vehicle 100 that executed a method according to an example embodiment of the present invention. Vehicle 100 includes device 110, first transceiver means 105, and first surroundings sensor system 101. The descriptions of first vehicle 100 and device 110 of first vehicle 100 can be considered representative of second and/or third vehicles 200, 300 as well. This also applies to the description and configuration of first surroundings sensor system 101, which is correspondingly provided as second surroundings sensor system 201 of second vehicle 200, as well as for first transceiver means 105 of first vehicle 100 and second transceiver means 205 of second vehicle 200. In principle, first and/or second transceiver means 105, 205 can be both mobile as well as non-mobile, i.e., mounted permanently in the first vehicle, transceiver means 105, 205. Accordingly, only the term transceiver means is used, although this can be understood to mean both mobile as well as non-mobile means.

First surroundings sensor system 101 is shown here by way of example as a video sensor with a detection unit toward the front and toward the rear, but can also be a radar sensor and/or a LIDAR sensor and/or an ultrasonic sensor, for example. In general, first surroundings sensor system 101 can be any number of sensors and any type of sensor suitable for detecting surroundings 150 of first vehicle 100.

First vehicle 100 further includes device 110, which includes third receiving means 111 for receiving a control signal, and control means 112 for controlling first surroundings sensor system 101 as a function of the control signal received by third receiving means 111.

Third receiving means 111 are designed in such a way that these receiving means are able to receive a control signal directly from an external server 400 and/or using first transceiver means 105. Third receiving means 111 are further designed to forward the received control signal to additional means in first vehicle 100, such as, for example, control means 112.

Control means 112 are designed in such a way that these control means convert a control signal forwarded by third receiving means 111, in order to activate and influence first surroundings sensor system 101 of first vehicle 100. The way of influencing in this case is a function of the control signal on the one hand and of the sensor itself on the other hand, such as, for example, of the model and/or of the efficiency and/or of the sensor type and/or of the arrangement on the vehicle and/or of the size and/or of the state and/or of additional sensor-related features.

Control means 112 can further be designed in such a way that these control means include all necessary additional means in order to enable not only an activation of first surroundings sensor system 101, but to also carry out a detection of surroundings 150 of first vehicle 100 using first surroundings sensor system 101. This can be, for example, a processor and/or a hard disk and/or a working memory and/or a graphics card, which are able overall—equipped with the necessary software—to carry out a detection of surroundings 150 of first vehicle 100 using first surroundings sensor system 101.

First vehicle 100 further includes first transceiver means 105. This can be understood to mean, for example, a smartphone and/or an additional device in first vehicle 100, which is designed to exchange signals with this smartphone. First transceiver means 105 are to be understood overall in such a way that they include everything or are designed to enable a transmission and reception of data between first vehicle 100 and an external transceiver outside first vehicle 100—if necessary, using additional means (such as, for example, a smartphone).

First transceiver means 105 are further designed in such a way that these means are able, for example, to transmit first surroundings data detected with the aid of first surroundings sensor system 101 to an external server 400.

Figure 2:
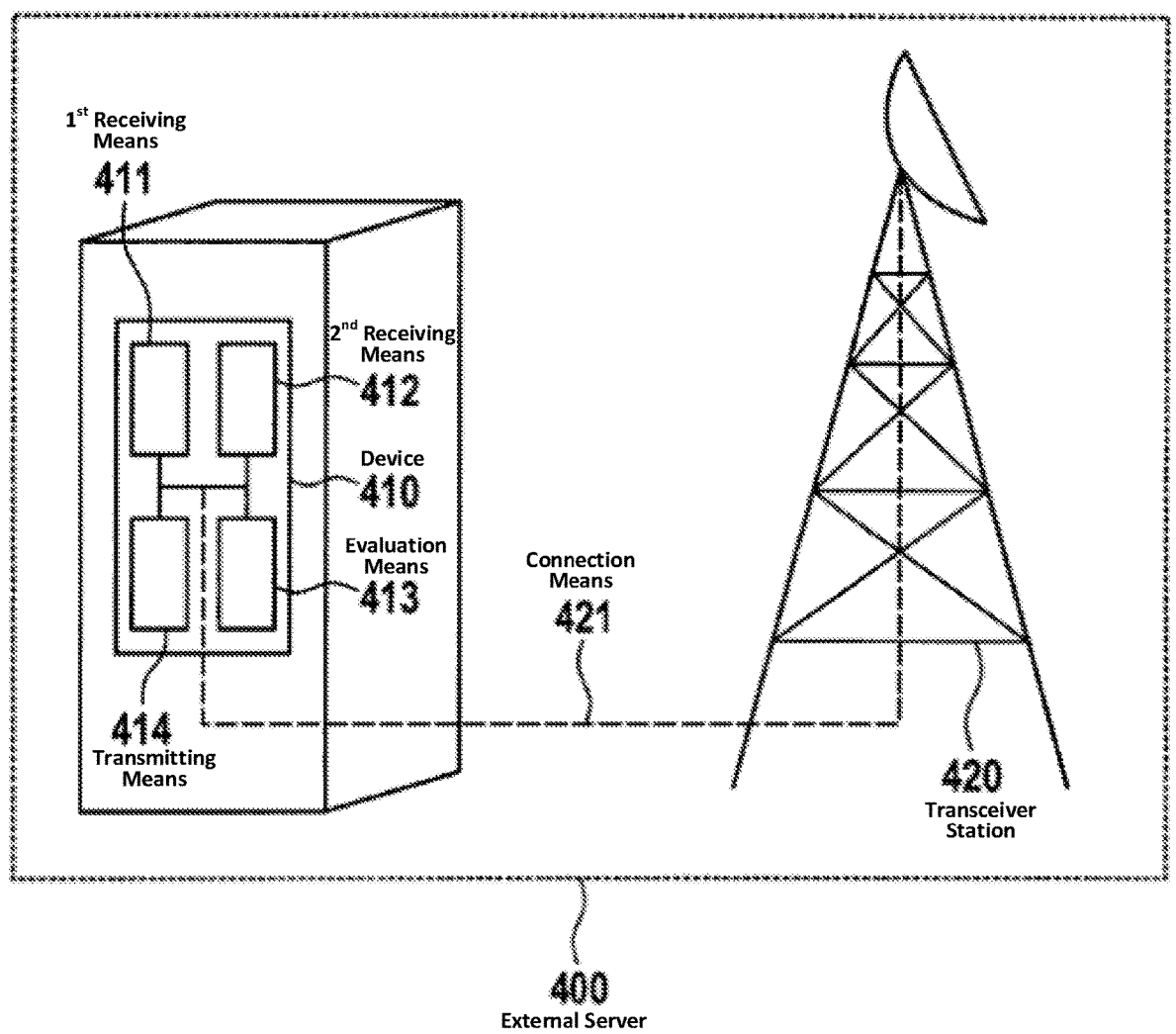
FIG. 2 shows an external server according to an example embodiment of the present invention.

FIG. 2 shows an external server 400, which includes device 410 according to an example embodiment the present invention. This device 410 includes first receiving means 411, second receiving means 412, evaluation means 413 and transmitting means 414. First receiving means 411 and second receiving means 412 in this case can be designed either as device means separated locally from one another or also as shared receiving means 411, 412. First receiving means 411 and/or second receiving means 412 can also be designed, together with transmitting means 414 as a shared transceiver. Both first receiving means 411 as well as second receiving means 412 as well as transmitting means 414 in this case can be designed in such a way that these means—designed individually or shared as described above—are able to directly transmit and/or to receive, or are also connected to an additional transceiver station 420, which is designed, for example, to transmit or receive over long distances using connection means 421.

Device 410 further includes evaluation means 413 designed to evaluate the quality of first surroundings sensor system 101 of first vehicle 100 and the quality of second surroundings sensor system 201 of second vehicle 200, respectively. In this case, evaluation means 413 include a processor, for example, and/or a hard disk and/or a working memory, which are designed to carry out the evaluation of the quality of first surroundings sensor system 101 of first vehicle 100 and the evaluation of the quality of second surroundings sensor system 201 and of second vehicle 200 using at least one computer program. This evaluation is carried out in this case in such a way, for example, that the first surroundings data values are combined with the second surroundings data values from which new third surroundings data values are formed, which represent shared surroundings of first vehicle 100 and of second vehicle 200.

This can take place, for example, by comparing these third surroundings data values with previously stored data patterns. Based on this comparison, an evaluation of the quality of first surroundings sensor system 101 of first vehicle 100 and of the quality of second surroundings sensor system 201 of second vehicle 200 is then subsequently carried using of predefined comparison criteria.

In another example embodiment, the quality of first surroundings sensor system 101 of first vehicle 100 and the quality of second surroundings sensor system 201 of second vehicle 200 is determined by comparing the first piece of information of first surroundings sensor system 101 with second surroundings sensor system 201. In the process, technical features can be read from the first piece of information and from the second piece of information, that first surroundings sensor system 101 of first vehicle 100 or second surroundings sensor system 201 of second vehicle 200 is better suited to detect surroundings data values.

Figure 3:
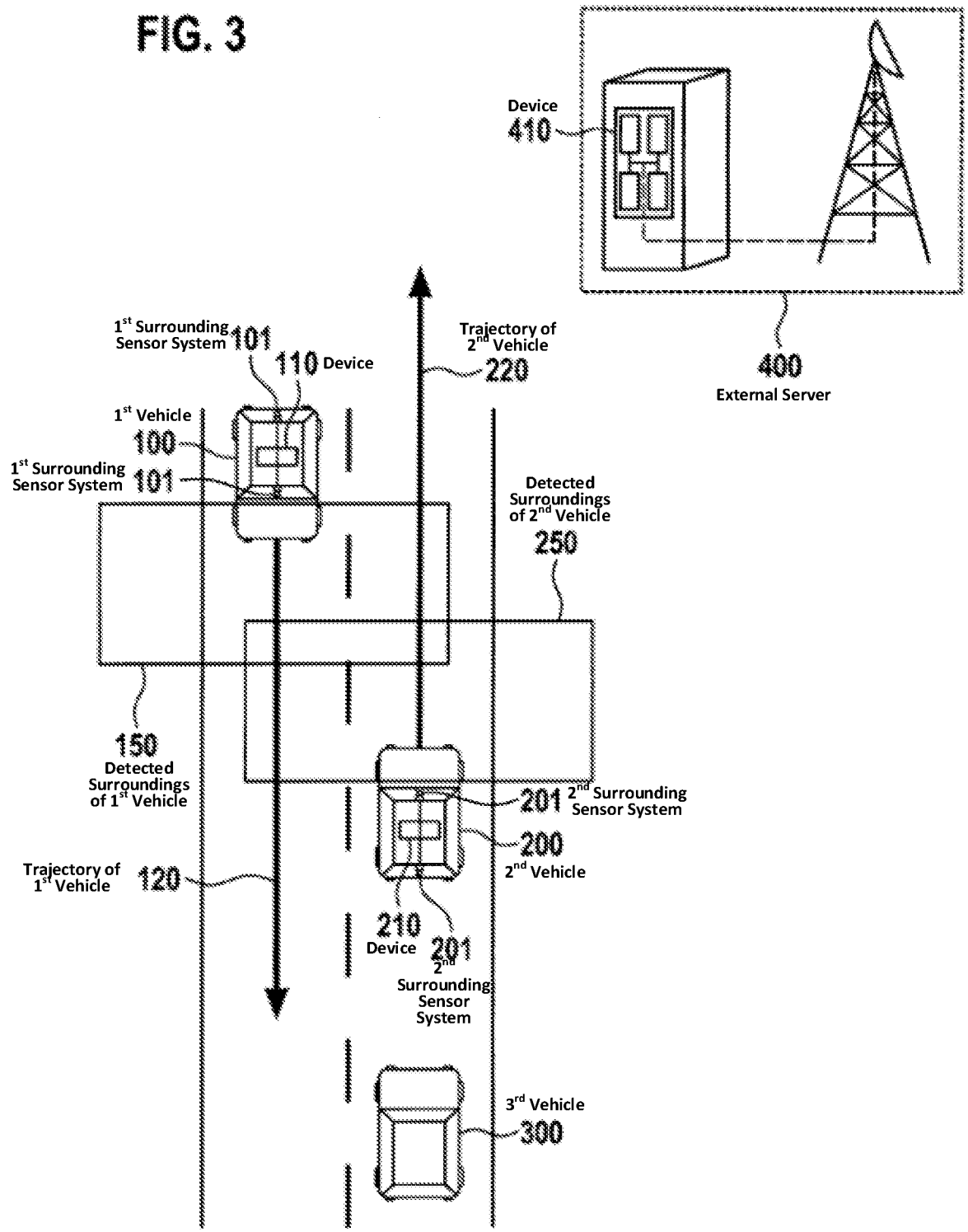
FIG. 3 shows an implementation of a method according to an example embodiment of the present invention.

FIG. 3 shows merely by way of example one exemplary application of the method according to the present invention, in which a situation is shown—representative of other examples—in which this method is used. In this case, a first vehicle 100 is shown, which detects surroundings 150 of first vehicle 100 using its surroundings sensor system 101. A second vehicle 200 is also apparent, which likewise detects surroundings 250 of second vehicle 200 using its surroundings sensor system 201. In the example shown here, there is an overlap between detected surroundings 150 of first vehicle 100 and detected surroundings 250 of second vehicle 200. A third vehicle 300 is also apparent, which is located in spatial proximity to first vehicle 100 and second vehicle 200. A detail of respective trajectories 120, 220 of first vehicle 100 and of second vehicle 200 are indicated by way of example here by arrows. Also shown is an external server 400, which encompasses device 410 according to the present invention.

Due to the overlapping of surroundings 120, 220 detected by first vehicle 100 and second vehicle 200, an impaired detection of the surroundings can result for both vehicles 100, 200 within the overlapped area, so that surroundings sensor system 101 of first vehicle 100 and surroundings sensor system 201 of second vehicle 200 disruptively influence this area. Since both first vehicle 100 as well as second vehicle 200 in this example are each equipped with a transceiver, both vehicles transmit surroundings data values representing first surroundings 150 of first vehicle 100 on the one hand, and second surroundings 250 of second vehicle 200 on the other hand to external server 400. External server 400 can then receive the surroundings data values transmitted by first vehicle 100 and by second vehicle 200 using device 410 and of those means encompassed by device 410, and can carry out an evaluation of the quality of first surroundings sensor system 101 and of second surroundings sensor system 201 using suitable evaluation means.

After the evaluation of the first surroundings sensor system and of the second surroundings sensor system, a signal for influencing first and/or second surroundings sensor system 101, 201 can be transmitted to first vehicle 100 and/or to second vehicle 200. Improved surroundings data values representing both surroundings 150 of first vehicle 101 and surroundings 250 of second vehicle 200 can then be detected and re-transmitted to external server 400.

The improved surroundings data values, originating from server 400, can subsequently be transmitted to first vehicle 100 and/or to second vehicle 200 and/or to at least one additional third vehicle 300.

The situation shown here, in which a first vehicle 100 approaches a second vehicle 200 coming in the opposite direction, third vehicle 300 being situated behind second vehicle 201, is selected merely by way of example. Another example, in which the method described herein is advantageously used, is at an intersection within a town. Here, the disruptive overlapping of a first surroundings sensor system 101 of a first vehicle 100 and a second surroundings sensor system 201 of a second vehicle 200 can be particularly dramatic if, for example, an object, such as, for example, a pedestrian or a cyclist, is situated in this overlapped area, which is not detected due to the overlapping. External server 400 in this case can be a component of the traffic infrastructure, such as a traffic light or a street light.

Figure 4:
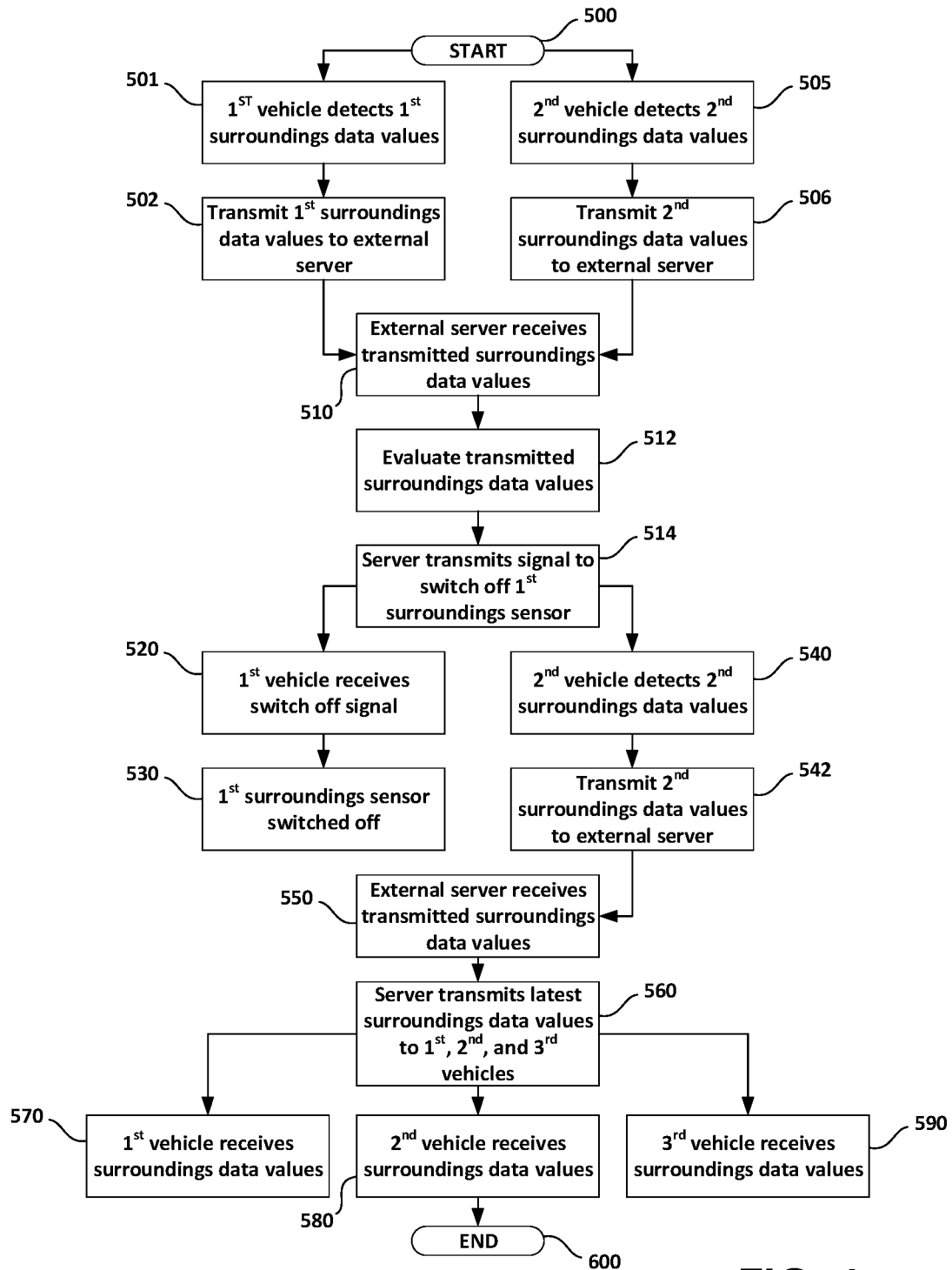
FIG. 4 is a flowchart that illustrates a method according to an example embodiment of the present invention.

FIG. 4 is a flowchart that illustrates an example method according to an example embodiment of the present invention. The method starts in step 500. In step 501, a first vehicle 100 detects first surroundings data values using its surroundings sensor system 101. In step 502, these surroundings data values are transmitted to an external server 400. In step 505, a second vehicle 200 detects second surroundings data values with the aid of its surroundings sensor system 201. In step 506, these surroundings data values are transmitted to external server 400. In step 510, external server 400 receives both the first surroundings data values of first vehicle 100 as well as the second surroundings data values of second vehicle 200 using its device 410.

In step 512, the quality of first surroundings sensor system 101 of first vehicle 100 and of second surroundings sensor system 201 of second vehicle 200 are evaluated using evaluation means 413 of device 410. In step 514, external server 400 transmits a signal for switching off first surroundings sensor 101 of first vehicle 100.

In step 520, first vehicle 100 receives the signal for switching off first surroundings sensor system 101. In step 530, first surroundings sensor system 101 of first vehicle 100 is switched off.

In step 540, second vehicle 200 again detects surroundings data values using second surroundings sensor system

201, this time an improved detection taking place, since first surroundings sensor system 101 no longer disruptively affects the detection of second surroundings sensor system 201. In step 542, second vehicle 200 transmits the newly detected surroundings data values to external server 400. In step 550, external server 400 receives the newly detected surroundings data values. In step 560, external server 400 transmits the newly detected surroundings data values to first vehicle 100, to second vehicle 200, and to the at least one additional third vehicle 300.

In step 570, first vehicle 100 receives the newly detected surroundings data values. In step 580, second vehicle 200 receives the newly detected surroundings data values. In step 590, the at least one additional third vehicle 300 receives the newly detected surroundings data values. The method ends in step 600.

What is claimed is:

1. A method for receiving, processing, and transmitting data, the method comprising:
   receiving first data values, wherein the first data values include first surroundings data values representing surroundings of a first vehicle and being detected using a first surroundings sensor system of the first vehicle;
   receiving second data values, wherein the second data values include second surroundings data values representing surroundings of a second vehicle and being detected using a second surroundings sensor system of the second vehicle;
   combining the first surroundings data values and the second surroundings data values to form third surroundings data values that represent an overlap, which is shared surroundings of the first vehicle and the second vehicle;
   comparing a pattern of the third surroundings data values to a predefined pattern;
   based on the comparison, determining an interference between the first surroundings sensor system and the second surroundings sensor system; and
   in response to the determination of the interference:
      transmitting a signal to the first vehicle that switches the first surroundings sensor system into an off state;
      while the first surroundings sensor system is in the off state, receiving again the second data values including the second surroundings data values from the second vehicle; and
      transmitting the second surroundings data values that were received again to the first vehicle.

2. The method of claim 1, wherein one or both of (a) the reception of one or both of the first and second data values and (b) the transmission of the signal is performed using a radio link.

3. The method of claim 1, wherein one or both of (a) the reception of one or both of the first and second data values and (b) the transmission of the signal is performed using a radio link of at least one mobile transceiver.

4. The method of claim 1, wherein one or both of (a) the reception of one or both of the first and second data values and (b) the transmission of the signal is performed using a radio link of at least one mobile transceiver of a smartphone.

5. The method of claim 1, wherein at least one of (a) the first data values include first trajectory data values that represent a first trajectory of the first vehicle, and (b) the second data values include second trajectory data values that represent a second trajectory of the second vehicle.

6. A device for receiving, processing, and transmitting data, the device comprising:
   a processor;
   a receiver; and
   a transmitter;
   wherein the processor is configured to:
      receive via the receiver:
         first data values that include first surroundings data values representing surroundings of a first vehicle and being detected using a first surroundings sensor system of the first vehicle; and
         second data values that include second surroundings data values representing surroundings of a second vehicle and being detected using a second surroundings sensor system of the second vehicle;
      combine the first surroundings data values and the second surroundings data values to form third surroundings data values that represent an overlap, which is shared surroundings of the first vehicle and the second vehicle;
      compare a pattern of the third surroundings data values to a predefined pattern;
      based on the comparison, determine an interference between the first surroundings sensor system and the second surroundings sensor system; and
      in response to the determination of the interference:
         transmit, via the transmitter, a signal to the first vehicle that switches the first surroundings sensor system into an off state;
         while the first surroundings sensor system is in the off state, receive again, via the receiver, the second data values including the second surroundings data values from the second vehicle; and
         transmit the second surroundings data values that were received again to the first vehicle.

7. The device of claim 6, wherein one or both of (a) the reception of one or both of the first and second data values and (b) the transmission of the signal is performed using a radio link.

8. The device of claim 6, wherein at least one of (a) the first data values include first trajectory data values that represent a first trajectory of the first vehicle, and (b) the second data values include second trajectory data values that represent a second trajectory of the second vehicle.

9. A non-transitory computer-readable medium on which are stored instructions that are executable by a processor and that, when executed by the processor, cause the processor to perform a method for receiving, processing, and transmitting data, the method comprising:
   receiving first data values, wherein the first data values include first surroundings data values representing surroundings of a first vehicle and being detected using a first surroundings sensor system of the first vehicle;
   receiving second data values, wherein the second data values include second surroundings data values representing surroundings of a second vehicle and being detected using a second surroundings sensor system of the second vehicle;
   combining the first surroundings data values and the second surroundings data values to form third surroundings data values that represent an overlap, which is shared surroundings of the first vehicle and the second vehicle;
   comparing a pattern of the third surroundings data values to a predefined pattern;

based on the comparison, determining an interference between the first surroundings sensor system and the second surroundings sensor system; and in response to the determination of the interference:

transmitting a signal to the first vehicle that switches the first surroundings sensor system into an off state;

while the first surroundings sensor system is in the off state, receiving again the second data values including the second surroundings data values from the second vehicle; and transmitting the second surroundings data values that were received again to the first vehicle.

10. A device in a first vehicle, the first vehicle including a first surroundings sensor system, the device comprising:

a transmitter;

a receiver; and a controller configured to transmit to an external device first data values that include first surroundings data values representing surroundings of the first vehicle and being detected using the first surroundings sensor system of the first vehicle;

wherein:

the external device is configured to:

receive the first data values including the first surroundings data values transmitted by the controller;

receive from a second vehicle second data values that include second surroundings data values representing surroundings of a second vehicle and being detected using a second surroundings sensor system of the second vehicle combine the first surroundings data values and the second surroundings data values to form third surroundings data values that represent an overlap, which is shared surroundings of the first vehicle and the second vehicle;

compare a pattern of the third surroundings data values to a predefined pattern;

based on the comparison, determine an interference between the first surroundings sensor system and the second surroundings sensor system; and in response to the determination of the interference:

transmit a signal to the first vehicle;

while the first surroundings sensor system is in an off state, receive again the second data values including the second surroundings data values from the second vehicle; and transmit the second surroundings data values that were received again to the first vehicle; and the controller is configured to:

receive the signal from the external device via the receiver;

respond to the received signal by switching the first surroundings system into the off state; and receive, via the receiver, the second surroundings data values transmitted by the external device.

* * * * *